US00H002190H

(19) United States
(12) Statutory Invention Registration
Chen

(10) Reg. No.: US H2190 H
(43) Published: Jun. 5, 2007

(54) SAMPLED ANALOG TRANSMISSION

(75) Inventor: Jerry Chen, Arlington, MA (US)

(73) Assignee: The United States of America as represented by the Secretary of the Air Force, Washington, DC (US)

(21) Appl. No.: 10/165,939

(22) Filed: Jun. 11, 2002

(51) Int. Cl.
*H04B 10/12* (2006.01)

(52) U.S. Cl. ..... 398/189; 398/191; 375/353

(58) Field of Classification Search ..... 398/189, 398/191; 375/353
See application file for complete search history.

(56) References Cited

PUBLICATIONS

"Pulse time modulation techniques for optical communications: a review", Wilson et al.; Optoelectronics, IEE Proceedings, vol. 140, Issue 6, Dec. 1993 pp. 347–357.*

"Digital Communication: Fundamentals and Applications"; Sklar; Prentice Hall, 1988; p. 59.*

* cited by examiner

*Primary Examiner*—Dan Pihulic
(74) *Attorney, Agent, or Firm*—William G. Auton

(57) ABSTRACT

Analog information is modulated onto a high repetition rate optical pulse stream. This modulated pulse stream is transmitted over optical medium, such as long distances of fiber, and is then detected. The pulses are removed leaving only the original analog signals. The sampled encoding onto pulses allows transmission of very broad band signals and mitigates the deleterious effects of self phase modulation, dispersion and Stimulated Brillouin Scattering.

4 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SAMPLED ANALOG TRANSMISSION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the modulation of optical signals and more specifically to a signal modulation system that samples and modulates a train of pulses.

Major applications where analog signals are transmitted over fiber include cellular (analog/digital/PCS), cable television, and electrical signals from antennae (such as satellite or radar signals). Unfortunately, analog signals are fragile. They are sensitive to dispersion, phase nonlinearities, scattering mechanisms and noise. Here we suggest a modulation format that mitigates these impairments. Consequently, analog signals can now travel longer distances with less degradation.

The current optical fiber universe appears to be dichotomy that is divided between a strict transmission of digital pulses, or in the alternative, a modulated carrier wave that forms an analog envelope. Samples of current technology are illustrated in the following U.S. Patents, the disclosures of which are incorporated herein by reference:

U.S. Pat. No. 6,259,281 Jul. 10, 2001, Parallel analog sampling circuit and analog-to-digital converter system incorporating clock signal generator generating subsampling clock signals with fast and precisely-timed edges, Neff, Robert M., U.S. Pat. No. 6,263,016, Jul. 17, 2001, Methods for interfacing a subscriber link to digital networks, Bellenger, Donald Morgan, U.S. Pat. No. 6,191,720, Feb. 20, 2001, Efficient two-stage digital-to-analog converter using sample-and-hold circuits, Zhang, U.S. Pat. No. 4,660,192, Apr. 21, 1987, Simultaneous AM and FM transmitter and receiver, Pomatto, Sr., Robert P.

B. Wilson and Z. Ghassemlooy, *IEE Proc J,* vol 140, Dec. 1993, pp. 346–57.

*Optical Fiber Telecommunications IIIA,* Academic Press, 1997, edited by I. P. Kaminow and T. L. Koch.

W. I. Way's book *Broadband Hybrid Fiber/Coax Access System Technologies,* Academic Press, 1999.

Fiber impairments are described in G. P. Agrawal's book, *Nonlinear Fiber Optics,* Academic Press, 1995. An overview of how fiber may affect analog systems can be found in M. R. Phillips and T. E. Darcie's chapter in *Optical Fiber Telecommunications IIIA,* Academic Press, 1997, edited by I. P. Kaminow and T. L. Koch. W. I. Way's book, *Broadband Hybrid Fiber/Coax Access System Technologies,* Academic Press, 1999 discusses this as well as some analog applications. They are incorporated herein by reference.

The Pomatto reference illustrates classic analog signal amplitude modulation (AM). This reference imprints the information of a modulating signal onto a sinusoidal carrier signal to output a modulated signal. The modulated signal is the carrier signal with an amplitude envelope that represents the curve of the modulating signal. The receiver demodulates the modulated signal to retrieve the original modulating signal and the information contained therein.

Using pulses to convey analog (or arbitrary time varying) information is rare but it does exist. Prior implementations have carried information in the pulse's width, frequency, (temporal) position, or interval. Called pulse time modulation, this is reviewed by the Wilson reference. In particular, on p. 348, a diagram alludes to the use of pulse shape to convey information though I have not seen any actual work that does this. Our preferred embodiment uses different characteristics of the pulse (namely, amplitude or envelope) to carry information. This patent also notes that information can also be carried in the pulses' energy, phase, and polarization, too.

SUMMARY OF THE INVENTION

The present invention is a signal modulation system that samples and modulates a train of pulses for analog signal transmission over a nonlinear, dispersive medium, which is normally optical fiber but could be a semiconductor, polymer or other waveguide.

For the sampled case, we must create a train of ultrashort optical pulses. The temporal spacing of the pulses is preferrably constant but does not need to be. This pulse train is then modulated. The intensity envelope (or alternatively, the polarization, phase, or energy) of the pulse train carries the information. This modulated pulse train is sent over the optical span. This span can contain optical medium (like fiber), WDM filters, optical amplifiers, dispersion compensating elements, etc. At the other end, the receiver converts from optical to electrical. Then a filter filters out all the high frequencies content associated with the pulses. What's left is the lower frequencies or the envelope which contains the original transmitted information. By the Nyquist principle, the repetition rate of the pulse train must be twice the highest signal frequency. In practice, to minimize intermixing of side bands, the repetition rate should exceed 4 to 8× the signal frequency. If the optical pulses are very short, it is important to add some dispersion compensation before, after or interspersed within the optical span.

This sampled or pulse transmission system shows improved signal-to-noise characteristics, and a greater tolerance to various fiber impairments. It can transmit a broader range of signal frequencies.

BRIEF DESCRIPTION OF THE DRAWINGS

FIG. 6 deals with prior art and 7 with new sampled case.

DESCRIPTION OF THE PREFERRED EMBODIMENT

Figure 1:
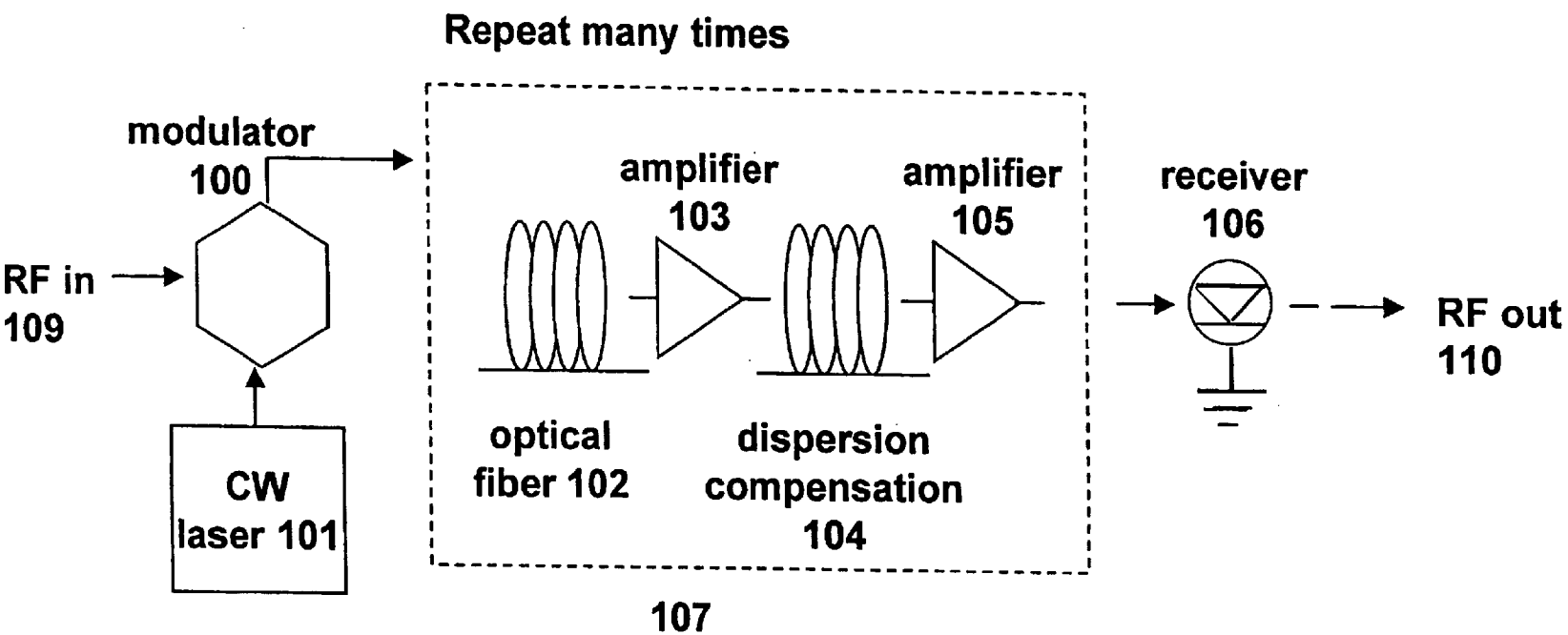
Figure 1 PRIOR ART
FIG. 1 shows the block diagram of a prior art fiber transmission system.

Fiber transmission of analog information is important for video and cellular and satellite signals. The dominant fiber impairments in a single wavelength system are Stimulated Brillouin Scattering (SBS) and self phase modulation (SPM).

For narrow linewidth sources, SBS limits fiber launch powers to a few milliwatts. Larger powers are backscattered and degrade the signal to noise ratio. Researchers have investigated ways to combat SBS and SPM. For example, phase and frequency modulation can broaden the frequency spectrum of the optical carrier and thereby increase the threshold at which SBS becomes significant to +16 dBm. Unfortunately, these additional phase dithers can generate composite second order (CSO) or second order intermodulation distortion—a spurious nonlinearity that introduces unwanted RF frequencies.

A specific manifestation of the Kerr effect, SPM creates frequency chirp or phase modulation at the signal's second harmonic. Dispersion then converts the phase modulation to intensity modulation. Called composite second order (CSO) or second order intermodulation distortion, this intensity modulation has been described by various formalisms and verified by an experiment. The second harmonics generated by CSO limits the transmission of RF signals to an octave. The difference frequencies associated with CSO may complicate the use of EDFAs, because the saturated gain of these optical amplifiers varies with sub-megahertz optical signals. So, naturally, systems with low CSO are desired. One way to minimize CSO is to reduce SPM or chirp. When given a choice, a system designer would try to use large core fibers and short transmission distances. But chirp will still depend on the optical modulation frequency and optical peak powers. If the chirp is linear, dispersion compensation can cancel the effect of chirp. Although such dispersion management has been demonstrated at one optical wavelength, but its extension to multi-wavelength, WDM systems is challenging. Furthermore, high frequency RF signals are particularly suspectible to dispersion, which smears out the phase coherence between positive and negative frequency bands. By eliminating one band, single side band modulation is less sensitive to fiber dispersion. Nevertheless, it is still difficult to design a wideband transmission link, especially if the link supports a wide range of frequencies and powers.

Here I propose a novel, sampling scheme, where the analog information is superimposed on a very high repetition rate optical pulse stream. Because this sampling rate (or pulse rep-rate) far exceeds the analog modulation frequency, the chirp is affected more by the sampling rate than the data rate, permitting compensation of a wide range of data rates. As a result, the formation of CSO is minimized. In addition, this fast sampling rate broadens the optical spectrum, mitigating the effect of SBS, permitting the transmission of higher optical powers. First, I will describe this novel transmitter and receiver, then discuss how sampling increases the Stimulated Brillouin Scattering threshold, simulate the fiber transmission of various signals and intermodulations (such as CSO). After comparing CW and sampled techniques for various modulation frequencies, I will conclude with some intuitive remarks.

Transmitter and Receiver Design

In the prior art (FIG. 1), high frequency electrical signals 109 are encoded onto an optical carrier when an external modulator 100 varies the intensity of a CW laser 101. In high frequency applications, lithium niobate modulators prevail as they offer low chirp and high frequency responses. More cost-effective modulators may use electroabsorptive semiconductors. Here, we will focus on the better performing ones, namely lithium niobate. FIG. 1 shows the block diagram of an external modulated laser, being modulated by two RF tones—9.5 and 10.5 GHz. In general, any frequency or range of frequencies can be used. These 2 are used as an example. Mathematically, the instantaneous optical power can be described by $$P(t) = \frac{1}{2} P_{avg}\{2 + \sin(2\pi f_1 t) + \sin(2\pi f_2 t)\},$$

where $f_1$, and $f_2$ are the signal tones at 9.5 and 10.5 GHz.

Figure 2:
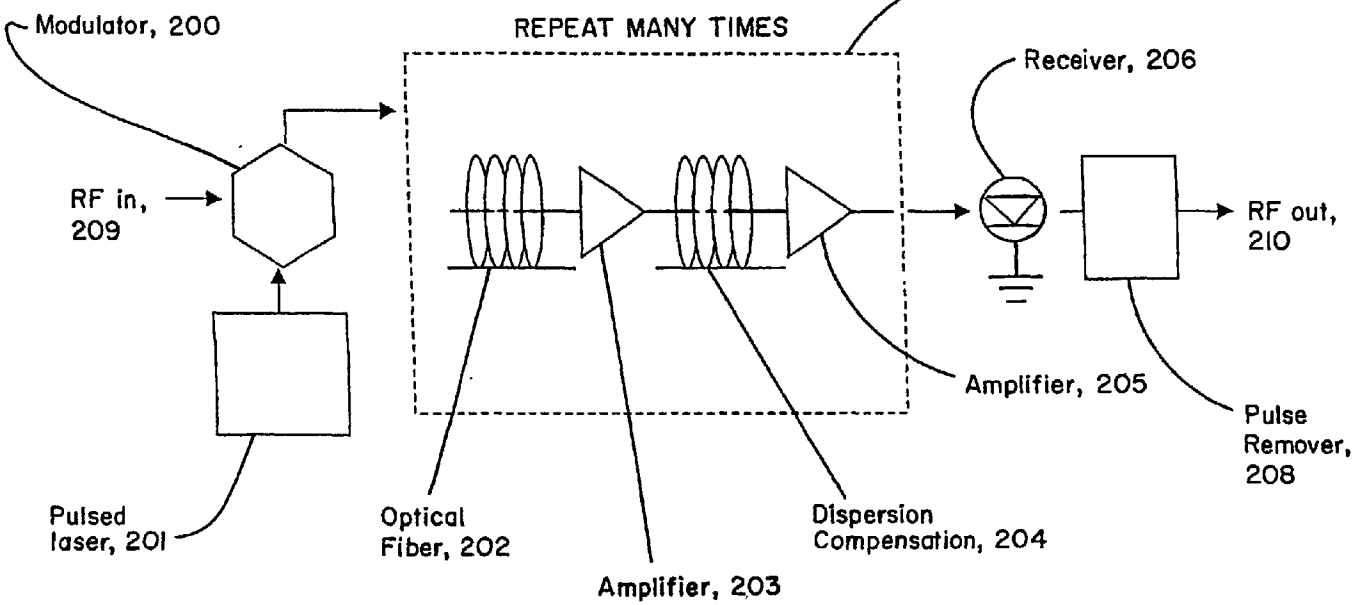
FIG. 2 shows the new sampled or pulse transmission system.

In our sampled method, we substitute the CW laser with an optical source 201 that can give short pulses at high repetition rates (FIG. 2). Its repetition rate must be twice the highest RF signal frequency to satisfy the Nyquist criterion. In practice, it is important that this "rep rate" be significantly larger. This prevents interference and mixing between the signal and the pulses' sidelobes. Here, I chose a 80 GHz "rep rate" to distinguish clearly between the signal harmonics and the pulses' frequencies. High "rep rate" sources are commercially available from Pritel Inc. of Naperville, Ill.

The instantaneous optical power of the sampled transmitter as a function of time is $$\frac{P_{avg}}{2\tau\sqrt{\pi}}\{2 + \sin(2\pi f_1 t) + \sin(2\pi f_2 t)\} \sum_{n=-\infty}^{\infty} e^{-(t-nT)^2/\tau^2}$$

where $\tau$ is the pulse width and T is the inter-pulse period (or inverse of repetition rate). The peaks of the pulse intensities form a slowly varying envelope, which is described by the beating of the two sine waves. This envelope resembles the CW case. It is this envelope that carries the information. The pulses are spaced by T=12.5 ps, which is the inverse of the 80 GHz repetition rate. Here, the full width half max (FWHM) of the pulses is an eighth of the period or FWHM= $T/8=2\tau\sqrt{\ln 2}=1.56$ ps. To facilitate comparison with the CW laser, the average optical power is kept the same, at 2.0 mW. This translates to a peak power of 30.1 mW. In the model, I used gaussian pulses. Fiber transmission simulations with sechant pulses didn't result in a material difference. Changing the pulse width affects the chirp, which in turn determines the optimal amount of dispersion compensation.

In prior art or the CW case, this modulated light is sent down a fiber 102. There may be optical amplifiers 103, 105 and dispersion compensating fibers 104. After some propagation, a diode converts the modulated light back to electricity 110. Often the optical and electrical signals are amplified. Generally, the receiver 106 consists of diode and amplifier. For high frequency signals, it is important to add some dispersion compensation 104 before, after or interspersed within the optical span 107. In general, light travels many spans.

For the sampled case, things are different. Instead of modulating a CW laser (laser with constant intensity) 101, now we modulate a train of pulses 201. In the preferred embodiment, the intensity envelope of the pulse train carries the information. The pulses' amplitude or energy can be modulated by a lithium niobate Mach Zehnder interferonmeter, electrorefractive Mach Zehnder interferonmeter, or an electroabsorption modulator. Alternatively, one can use a phase modulator (such as lithium niobate or electrorefractive) to modulate the pulse's optical phase. Or one can use a polarization controller to modulate the pulse's polarization. This modulated pulse train is sent over optical span 207, which can include one or more of the following: optical fiber 202, midspan amplifier 203, dispersion compensation 204, and preamplifier 205. The span can also include postamplifiers placed before the fiber and WDM demultiplexers and multiplexers. Normally, the modulated pulses travel through many spans. In terrestrial networks each span is different from the next. In undersea systems, most spans are similar to each other. At the other end, the receiver 206 converts from optical to electrical. Then pulse remover 208 filters out all the high frequencies content associated with the pulses. What's left is the lower frequencies 210 or the envelope which contains the original signal information.

The preferred embodiment of the pulse remover is an electrical low pass filter to extract the pulse's amplitude. Instead of a low pass filter, one could use a bandpass filter (centered around signal frequencies) or an electrical peak and hold circuit (which will filter out high frequencies associated with repetition rate). Alternatively, one can consider the information to be carried by the pulse's energy rather than peak (or amplitude). Then the receiver would use an integrator. This integrator would be optical or electrical, depending on whether it was placed before or after the diode. Optical integrators would be slow saturable absorbers. Electrical integrators can be designed with resistors, capacitors and opamps or with the high speed equivalent thereof. If the information is carried in the pulses' phase, one can use an asymmetric Mach Zehnder to convert the phase to amplitude, then detect the signal, then filter out the high frequencies of the pulse. Another way to measure phase is to detect, converting to electrical, then using a RF delay line (or frequency discriminator) to convert the phase changes to amplitude changes, then filter out the high frequency content of the pulses. The polarization can be measured by placing a polarization filter before the detector, so as to select one principal polarization state. It would be nice to have a feedback loop that rotates the polarization filter so the filter admits most of the light. This feedback loop needs only track very slow changes in polarization that occur due to temperature variations in the fiber plant. The signal data rate must be much faster than what the feedback loop can handle; else the signals would be lost.

Mitigation of Stimulated Brillouin Scattering

Stimulated Brillouin Scattering limits the amount of optical power in a narrow band. In amplitude modulated systems, most of narrow band signals are at the laser's emission frequency. In my comparison of sampled and CW transmitters, I use an average power of 2 mW. This is below the SBS threshold of Truewave fiber.

Figure 3:
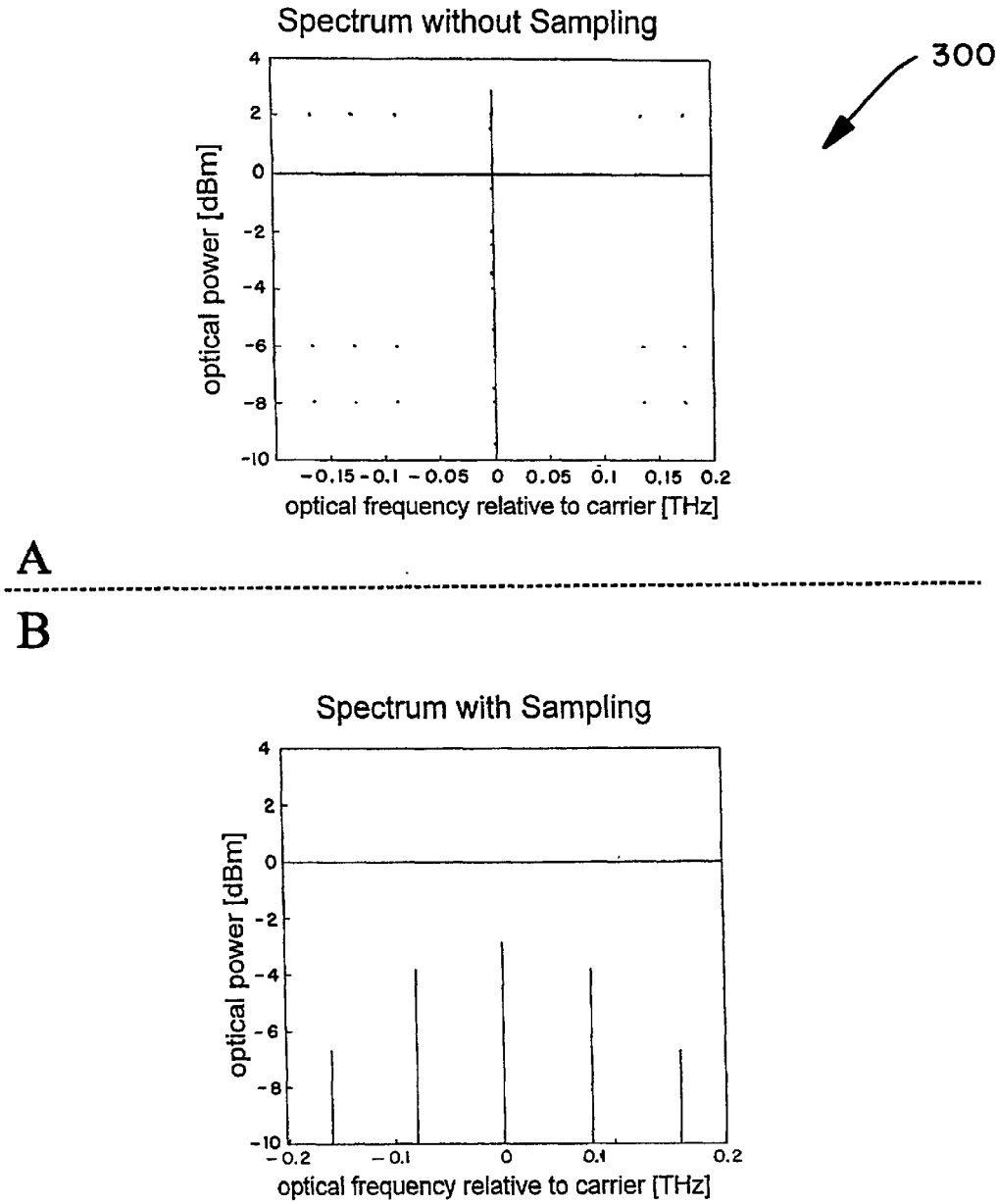
FIG. 3 plots the optical frequency spectrum of the CW transmitter and the sampled transmitter, before any fiber propagation.

FIG. 3 compares the optical power spectrum of normal CW transmitter and our sampled transmitter. The left plot shows that most of the optical power of the CW transmitter is in the laser emission frequency. Here it is almost 3 dBm. The amplitude modulated sidelobes are very small, having only a few percent of the total power. Putting more optical power in the sidelobes would introduce spurious nonlinearities and intermods, associated with the raised sine transfer function of the $LiNb0_3$ modulator.

For the sampled transmitter, the optical power spectrum is shown in FIG. 3*b*. Again, much of the optical power is at the laser emission frequency, although there is significant power at harmonics of 80 GHz away. The pulsed nature of the source tends to smear out the optical spectrum, reducing the power at the laser emission frequency to −2.83 dBm, which is 5.7 dB lower than the modulated CW laser. Shorter pulse widths will lower the peak power (at the laser emission frequency) even more. This means we can increase the average power further without exceeding the SBS threshold.

Increasing the average power means that the optical signals are larger—further away from the noise floor. This tends to increase the signal to noise ratio (SNR). As the noise is dominated by amplitude spontaneous emission (ASE) noise from the EDFAs, the electrical SNR in a 1 Hz band can be written as $$SNR = \frac{P_{signal}^2}{N_{ASE} P_{avg}},$$

where $P_{avg}$ is the average optical power, $P_{signal}$ is the optical signal power, and $N_{ASE}$ is the optical ASE noise. Assuming self phase modulation is weak, the signal power is roughly proportional to the average power. Then the SNR improvement can be expressed as $$\frac{SNR^{pulse}}{SNR^{CW}} = \frac{P_{avg}^{pulse}}{P_{avg}^{CW}} = \frac{S^{CW}}{S^{pulse}},$$

where pulse and CW denote the sampled and normal cases. S is the peak power of the optical spectrum divided by the total optical power. In the pulse case, where we have 5.7 dB less power in the spectral peak, we can achieve a 5.7 dB increase in the electrical SNR.

Transmission Simulations

Figure 4:
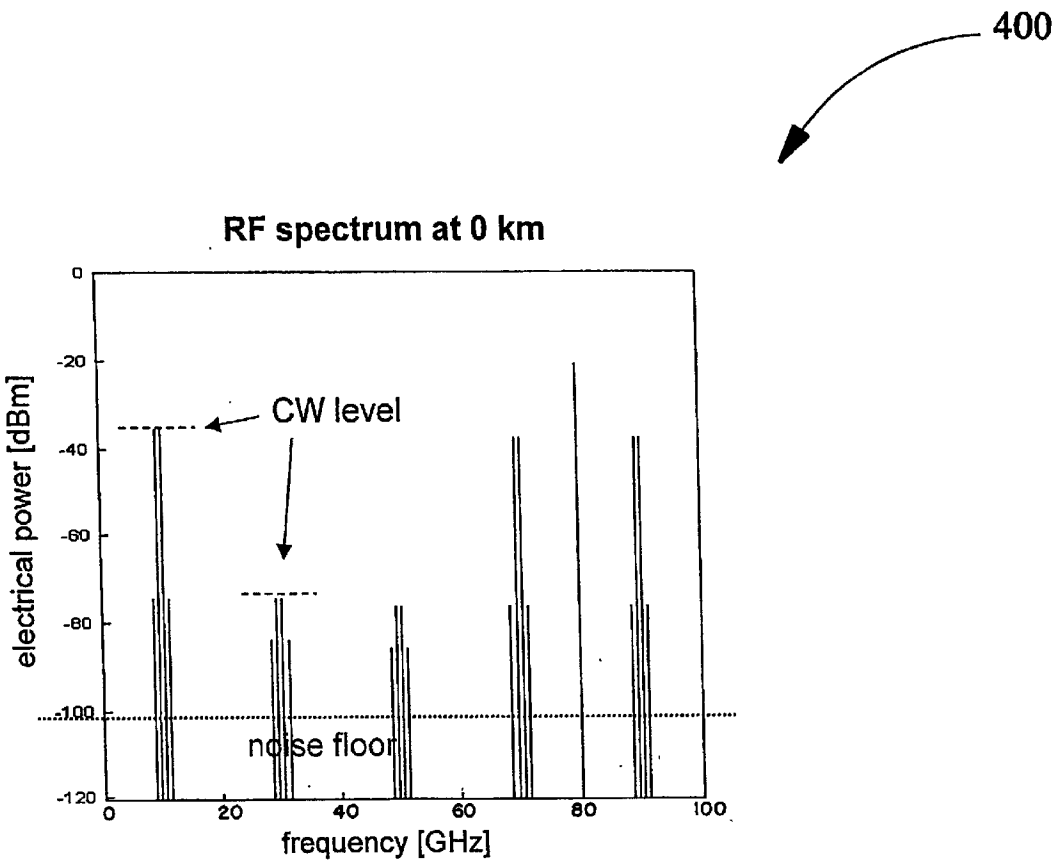
FIG. 4 plots the electrical or RF spectrum of the sampled transmitter, before any fiber propagation. Dotted lines show CW transmitter's signal and third intermod.

The analog link is simulated with a commercial software package—Virtual Photonic Incorportated's PTDS 1.2. Using the split step Fourier method, this simulator includes self phase modulation, cross phase modulation, Raman, dispersion, and loss. Noise comes from the EDFA and PIN. The electrical power spectrum after the modulator before fiber propagation is shown in FIG. 4. This back-to-back propagation involves the transmitter going directly into a PIN receiver. The data is represented by tones at 9.5 and 10.5 GHz. Since the modulator is biased at quadrature, there is no second order intermod at 20 GHz. However, there are signals near 30 GHz and at 8.5 and 11.5 GHz caused by third order nonlinearities. These third order terms come from the nonlinear transfer function of the lithium niobate modulator. Marked with a dotted line, the noise floor at −100 dBm comes from the PIN receiver. A signal bandwidth of 100 MHz is assumed. The sizable RF power at 80 GHz corresponds to the repetition rate of the pulsed laser. The modulation of the RF signal mixed with this 80 GHz frequency gives the tones around 70 and 90 GHz. There are some RF tones near 50 GHz associated with third order intermods associated with the 80 GHz repetition rate and fifth order intermods associated with the signal itself. All these high frequencies can be filtered away without much effect on the signals near 10 GHz. Superimposed on FIG. 4 are dotted lines showing where the CW case's signal and third harmonic lie.

In my first example, the modulated light goes through ten optical spans 207, each containing 50 km of Truewave fiber 202 (2.7 ps/nm/km, 0.0667 ps/nm$^2$/km, $A_{eff}$=55 μm$^2$, α=0.2 dB/km), 1.69 km of dispersion compensating fiber 204 (−80 ps/nm/km, −0.00186 ps/nm$^2$/km, $A_{eff}$=20 μm$^2$, α=0.6 dB/km), and two erbium doped fiber amplifiers 203, 205 (EDFA). Each EDFA amplifies the signal back to its original 2 mW or 3 dBm, has a noise figure of 4.0, and incorporates a 300 GHz wide optical filter. The light is then detected by a PIN photodiode 206. The fiber nonlinear index is $n_2=2.6\cdot10^{-20}$ and the Raman coefficient is 0.3. The net dispersion is zero but residual dispersion slope remains. Neglecting the spans of dispersion compensating fiber, the total propagation distance is 500 km. Though this example uses Truewave fiber, this method can use any type of optical fiber. Also, dispersion compensation can be done by other means besides DCF. For example, one can use higher-order modes, virtual image phase arrays, optical resonators, fiber Bragg gratings, etc.

Figure 5:
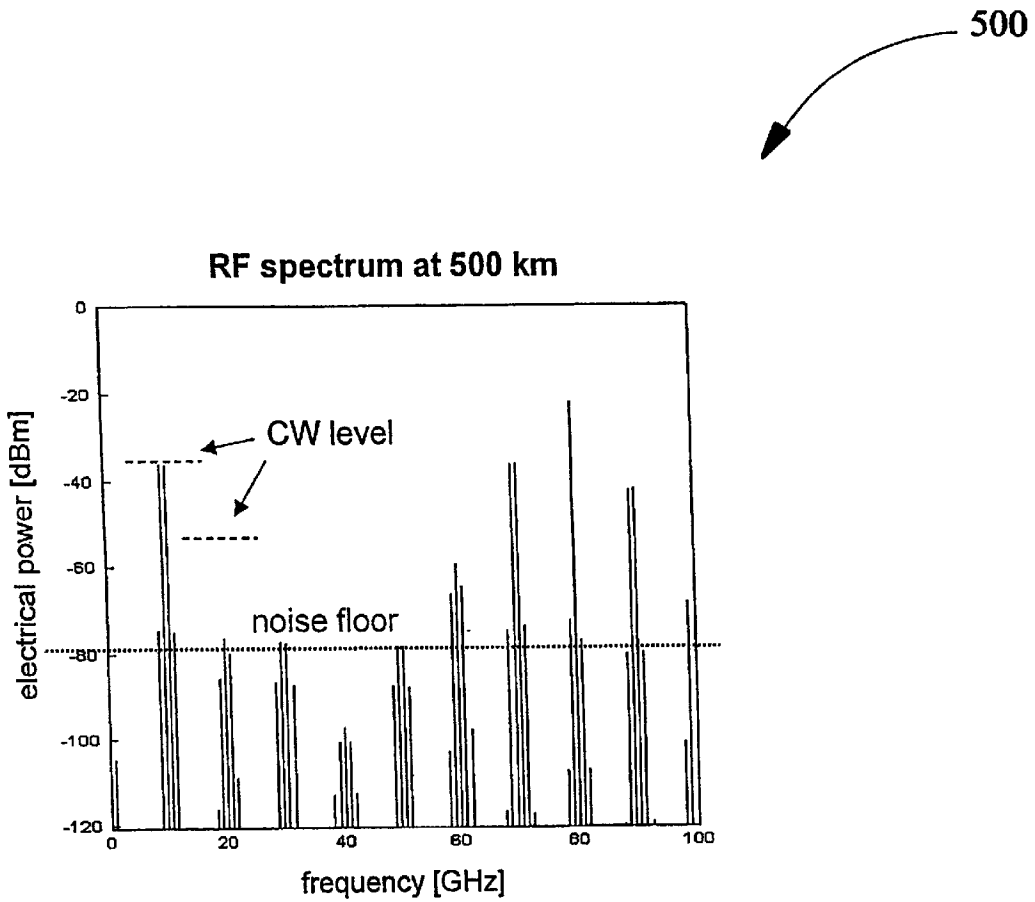
FIG. 5 plots the detected RF spectrum using the sampled technique, after 10 spans, each with 50 km of Truewave, DCF, and two EDFA's. Dotted lines show CW transmitter's signal and second intermod.

The electrical spectrum of the pulsed analog signal after fiber propagation is plotted in FIG. 5. Dotted lines mark the noise floor, CW's signal level, and CW's second harmonic. Note the noise floor is the same for the CW and pulse because they share the same average power. Here the signal to noise ratio is 117 dB•Hz: Similar to the back-to-back case, the signal terms are at 9.5 and 10.5 GHz, and their third order intermods appear at 8.5 and 11.5 GHz. Again, their magnitude seems unaffected by fiber propagation. Furthermore, the signal level of—40 dBm is identical to that of the CW case, so the SNR is the same. The repetition rate of the gaussian source 201 gives the RF power at 80 GHz. As before, the signal modulation of the gaussian pulse train around 10 GHz gives frequency terms near 50, 70, 90, and 110 GHz. What is new is the interplay between SPM and dispersion, creating second order internod terms near 0, 20, 60, and 100 GHz. Fourth order terms also appear at 40 GHz and 120 GHz. The second order intermod terms, which give rise to CSO, are very small—below the noise floor. Compared to the pulse case, the CSO for the CW case is over 20 dB higher. However, by compensating with a different length of fiber, the CW's CSO can also be suppressed below the noise floor. A major advantage of sampling the optical signal is the relative insensitivity of the second intermod, for varying modulation frequencies. So, one can select an appropriate level of dispersion compensation to suppress the CSO for a wide range of modulation frequencies.

To test this, modulated light is sent down 10 spans of 50 km Truewave fiber, 1.69 km DCF segments, and in-line EDFAs. As before, the EDFAs boost the optical power back to 2 mW. However, at the last span, the amount of dispersion compensating fiber can be varied, to compensate for any residual chirp. For each amount of dispersion compensating fiber, I calculate the electrical signal power and the largest intermodulation product. Generally, the second order intermod is larger; it is not fuilly compensated by the right amount of fiber. However, when the DCF length is optimal for suppressing second order intermod, the third order modulation may dominate. Various RF tones spanning over an octave were simulated.

Figure 6:
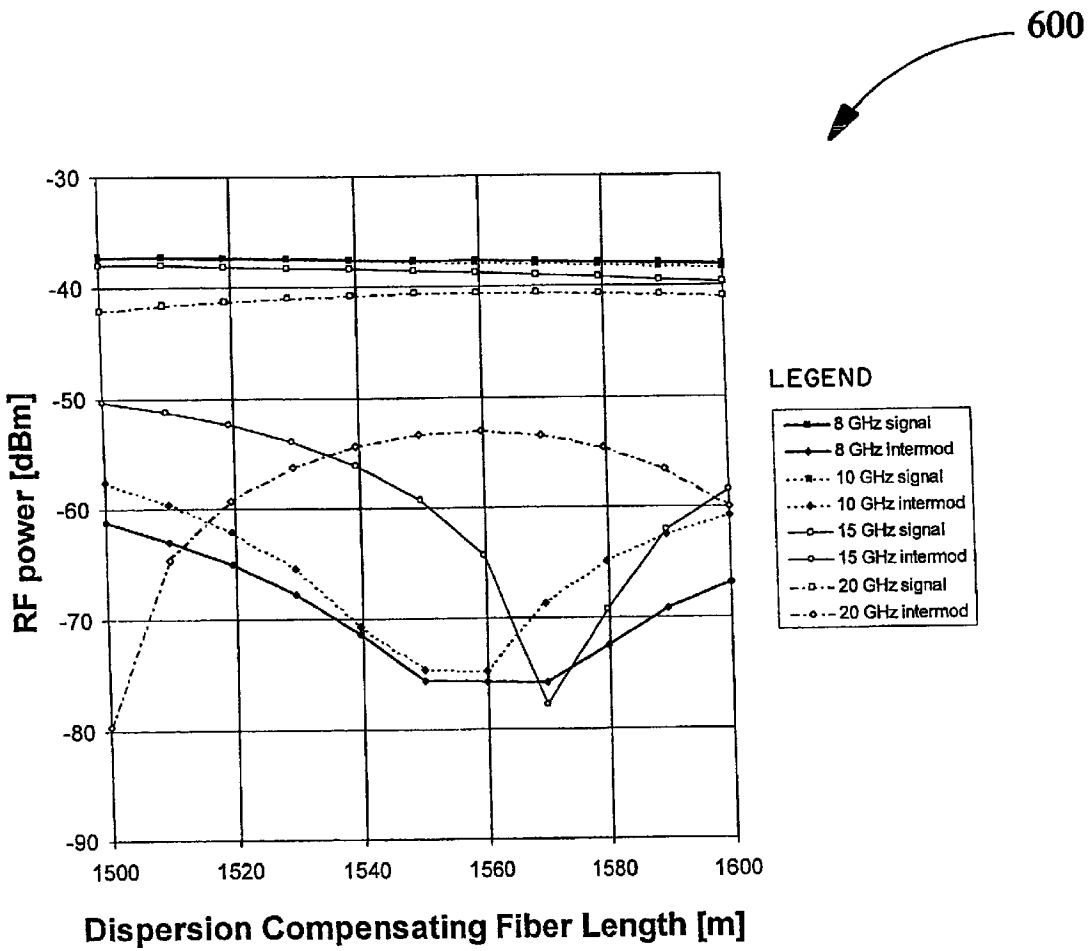
FIGS. 6 and 7 plot the detected electrical powers of the signal and intermodulations versus dispersion compensating fiber length, for various modulation frequencies, after 10 spans, each with 50 km of Truewave, DCF, and two EDFA's.

With the CW laser, five different RF signals were simulated. For example, RF tones near 8 GHz (namely, 7.5 and 8.5 GHz) were simulated. Then, I simulated tones, spaced by 1 GHz, centered around 10, 15, and 20 GHz. The signals and largest intermods are plotted in FIG. 6 for various lengths of DCF. The amount of DCF for zero net dispersion is 1.687 km. The signal level is around −40 dBm and seems rather insensitive to amount of residual dispersion. In contrast, the point of minimum intermod varies sharply with the amount of DCF. At a fixed modulation frequency the intermod value may vary over 30 dB. Consequently, it would be important to set the DCF length accurately. For 15 GHz, the optimal length of DCF is 1570 m. For tones near 20 GHz, however, this changes to 1500 m. If one were to design a fiber link that can support an octave range of signals, the maximum signal to noise ratio would be 20.1 dB, which occurs at DCF length of 1600 m.

Figure 7:
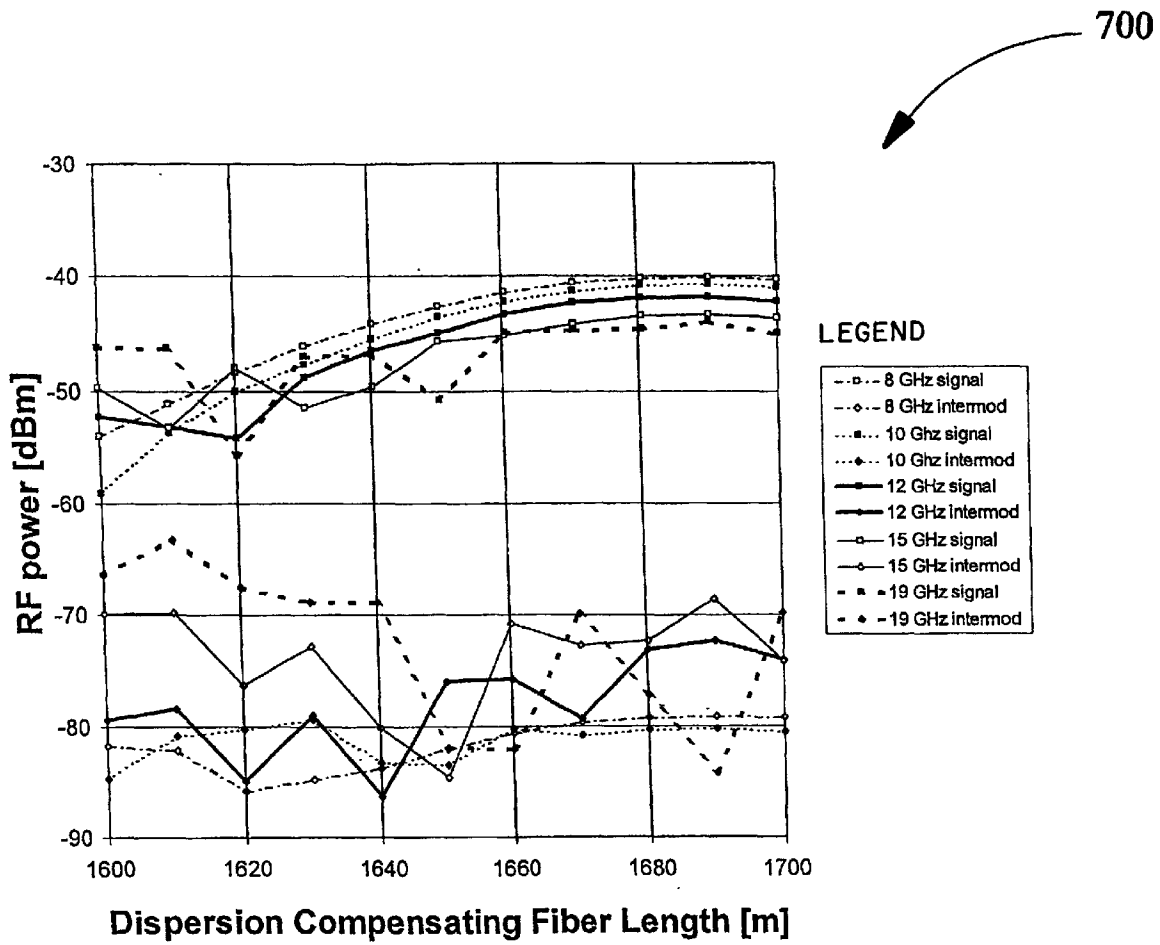

The sampled transceiver is a bit more immune to variations in modulation frequency. Here the 1 GHz spaced tones are centered around 8, 10, 12, 15, and 19 GHz. FIG. 7 plots the signal and intermods for various lengths of DCF. Although the average power could be increased by 5.7 dB due to the pulses' mitigation of SBS (FIG. 3), the average optical power is kept at 2 mW to facilitate comparison with the CW case. Compared to the CW case, the signal levels here are more sensitive to dispersion; the 80 GHz repetition rate is taking its toll. The signal level is maximum around 1687 m, where the net dispersion is zero. Having a non-zero net dispersion would broaden or smear out the pulses. Since the receiver has a low pass filter, detecting peak optical powers, this broadening lowers the signal level. However, the intermod power levels are lower. For non-optimal values of DCF, they fluctuate by only 20 dB. Furthermore, the intermod levels appear less sensitive to the modulation frequency. As noted before, the pulse repetition rate has a high enough frequency so as to swap out the effect of the slower RF modulation rate. For an octave of signals, the maximum signal to intermod ratio is 27.8 dB occurring at 1680 m DCF. This is over 7 dB higher than the CW case. The amount of DCF could vary by 50 m (or 4 ps/nm) and the signal to intermod ratio would still exceed 24 dB. In conclusion, sampling increases the signal to intermod ratio.

Using pulses to transmit information can be non-obvious since for a given average optical power, their peak power is higher so they should be more sensitive to fiber nonlinearities. Yet, these high repetition rate pulses have a larger frequency content than CW so they are more sensitive to dispersion. So, the pulses smear out after a very short distance into the fiber so the pulses resemble CW light; their peak intensity is no longer large, reducing the effect of fiber nonlinearities. One does have to be careful to inject the appropriate amount of dispersion compensation to restore the pulses to their original, unsmeared shape. Even then, some residual uncompensated dispersion is acceptable because such dispersion would smear out the pulse slightly. So, long as the pulses don't smear or spread out too much so the pulses overlap significantly, their envelope (and the information) remains intact. In contrast, the CW case does not have a buffer region or temporal dead space between pulses so it is very sensitive to the amount of dispersion compensation. This is evident in how their intermodulation levels vary with dispersion.

Now, intuitively, why does sampling or pulses help out? The interaction of fiber nonlinearities and dispersion makes the optimum design of the fiber transmission system sensitive to the optical power and the signal frequency/bandwidth. Here we introduce pulses with a high repetition rate, so the power and frequencies of these pulses dominate that of the signal. Then an optimal system, with large signal to intermod ratios, is designed around the pulse characteristics. So, a wide range of signal frequencies can now be supported within a sigle design. In addition, the pulses distribute the power from an otherwise large CW carrier frequency into harmonics of the repetition rate. This mitigates deleterious effects from Stimulated Brillouin Scattering, which limits the optical power in a given frequency. As a result, now, larger average powers can be transmitted. Larger powers means larger signal to noise ratios.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A signal modulating apparatus comprising:

a means to generate an optical pulse train, a means for modulating the pulse train with a signal carrying time varying information, a means to transmit this sample signal over an optical span or plethora of spans, a means to detect the sampled signals, and a means to remove the pulses so as to recover the original time varying information.

2. A signal modulating apparatus as defined in claim 1, wherein said modulation comprises change in optical pulse amplitude and wherein said pulses are removed by a low pass electrical filter.

3. A signal modulating apparatus as defined in claim 1, wherein said modulation comprises change in optical pulse energy;

and wherein said pulses are removed by an integrator.

4. A signal modulating apparatus as defined in claim 2, wherein said optical span is comprised of a combination of optical fibers, optical amplifiers, and dispersion compensators.

* * * * *